US012762836B2

(12) United States Patent
Jeon et al.

(10) Patent No.: US 12,762,836 B2
(45) Date of Patent: Oct. 13, 2026

(54) AUTOMATIC CHECKOUT SYSTEM, METHOD FOR CONTROLLING AUTOMATIC CHECKOUT SYSTEM AND STORAGE MEDIUM STORING INSTRUCTIONS TO PERFORM METHOD FOR CONTROLLING AUTOMATIC CHECKOUT SYSTEM

(71) Applicant: Research Business foundation SUNGKYUNKWAN UNIVERSITY, Suwon-si (KR)

(72) Inventors: Jae Wook Jeon, Suwon-si (KR); Long Hoang Pham, Suwon-si (KR); Hyung-Min Jeon, Suwon-si (KR); Duong Nguyen-Ngoc Tran, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 288 days.

(21) Appl. No.: 18/512,206

(22) Filed: Nov. 17, 2023

(65) Prior Publication Data

US 2024/0312185 A1 Sep. 19, 2024

(30) Foreign Application Priority Data

Nov. 17, 2022 (KR) ........................ 10-2022-0154620

(51) Int. Cl.
*G06V 10/764* (2022.01)
*G06V 40/10* (2022.01)
(Continued)

(52) U.S. Cl.
CPC .......... *G06V 10/764* (2022.01); *G06V 40/107* (2022.01); *G07G 1/0036* (2013.01); *G07G 1/12* (2013.01)

(58) Field of Classification Search
CPC .. G06V 10/764; G06V 40/107; G07G 1/0036; G07G 1/12
See application file for complete search history.

(56) References Cited

U.S. PATENT DOCUMENTS 11,481,751 B1 * 10/2022 Chaubard .............. G06V 10/82
2022/0343308 A1 * 10/2022 Yang .................... G07G 1/0036
(Continued)

FOREIGN PATENT DOCUMENTS

JP 2005-174352 A 6/2005
JP 7125179 B1 8/2022
(Continued)

OTHER PUBLICATIONS

Request for the Submission of an Opinion for Korean Patent Application No. 10-2022-0154620, dated Jun. 20, 2025.
(Continued)

*Primary Examiner* — Stephen R Koziol
*Assistant Examiner* — Raven Simone Jones

(57) ABSTRACT

There is provided a device for controlling an automatic checkout system. The device comprises a storage medium configured to store a product detection model trained based on training images in which parameters of a plurality of sample images are manipulated and one or more commands; and a processor configured to execute the one or more commands stored in the storage medium, wherein the instructions, when executed by the processor, cause the processor to: sequentially load a plurality of frame images, input the plurality of loaded frame images into the product detection model, detect at least one product from each of the plurality of frame images, track at least one product detected in each frame image, and count at least one product detected based on a tracking result.

20 Claims, 7 Drawing Sheets

(51) Int. Cl.

| | |
|---|---|
| ***G07G 1/00*** | (2006.01) |
| ***G07G 1/12*** | (2006.01) |

(56) References Cited

U.S. PATENT DOCUMENTS

| | | | | |
|---|---|---|---|---|
| 2023/0079018 A1* | 3/2023 | Fisher | G06V 10/7515 | 382/103 |
| 2023/0252443 A1* | 8/2023 | McDaniel | G06V 10/255 | 705/23 |

FOREIGN PATENT DOCUMENTS

| | | | | | |
|---|---|---|---|---|---|
| KR | 10-2011-0000789 A | | 1/2011 | | |
| KR | 10-2015-0140359 A | | 12/2015 | | |
| KR | 10-2021-0004818 A | | 1/2021 | | |
| KR | 20210004818 A | * | 1/2021 | G01C 21/206 | |
| KR | 10-2022-0026880 A | | 3/2022 | | |
| KR | 10-2022-0086277 A | | 6/2022 | | |
| WO | WO-2019032305 A2 | * | 2/2019 | G06Q 20/203 | |

OTHER PUBLICATIONS

Written Decision on Registration for Korean Patent Application No. 10-2022-0154620, dated Jul. 7, 2026.

* cited by examiner

AUTOMATIC CHECKOUT SYSTEM, METHOD FOR CONTROLLING AUTOMATIC CHECKOUT SYSTEM AND STORAGE MEDIUM STORING INSTRUCTIONS TO PERFORM METHOD FOR CONTROLLING AUTOMATIC CHECKOUT SYSTEM

This work was supported by Institute of Information & communications Technology Planning & Evaluation (IITP) grant funded by the Korea government (MSIT) (No. 2021-0-01364-002, Continuous Real-time Intelligent Traffic Monitoring System on Edge Devices).

TECHNICAL FIELD

The present disclosure relates to an automatic checkout system that automatically identifies and counts products on a checkout counter, and a method controlling of the automatic checkout system.

BACKGROUND ART

Recently, innovations have occurred in the retail industry through the application of artificial intelligence (AI) and computer vision (CV) technologies. Among them, an automatic checkout (ACO) technology can be considered the most core technology in this field. In the case of an ideal automatic checkout system, when a customer places the products he or she has selected at the checkout counter, the system can recognize each product without a hitch and return an accurate list of purchased items at once.

This automatic checkout system is being researched to solve object occlusion, motion blur, similarity between products, and costs incurred in case of detection or classification errors. In addition, when applying machine learning such as deep learning to build the automatic checkout system, it is important to collect training image data that reflects the unique characteristics of diverse product types and classifications and frequently updated product lists.

In other words, accuracy, stability, and efficiency are key factors to consider in the development of the automatic checkout system.

SUMMARY

An object of the present disclosure is to provide an automatic checkout system for counting at least one product in a plurality of frame images using a detection model generated by training a training image dataset based on a plurality of sample images, and a method of controlling the automatic checkout system.

The aspects of the present disclosure are not limited to the foregoing, and other aspects not mentioned herein will be clearly understood by those skilled in the art from the following description.

In accordance with an aspect of the present disclosure, there is provided an automatic checkout system, the automatic checkout system comprises: a storage medium configured to store a product detection model trained based on training images in which parameters of a plurality of sample images are manipulated and one or more commands; and a processor configured to execute the one or more commands stored in the storage medium, wherein the instructions, when executed by the processor, cause the processor to: sequentially load a plurality of frame images, input the plurality of loaded frame images into the product detection model, detect at least one product from each of the plurality of frame images, track at least one product detected in each frame image, and count at least one product detected based on a tracking result Additionally, the parameters of the plurality of sample images may include at least one of a number of products per training image, a rotation angle of each sample image, a scale ratio of each sample image, and a gamma adjustment value of each sample image.

Additionally, the training images may be generated by manipulating the parameter of each sample image to which a binary mask is applied.

Additionally, the training images may be generated by placing sample images to which the binary mask is applied on a checkout counter image, and placing a degree of overlap between products of each sample image within a predetermined cluster ratio range.

Additionally, the storage medium may be configured to store a hand detection model trained to detect a hand region from a plurality of input images, and the processor may be configured to input the plurality of frame images into the hand detection model to predict at least one hand region from each frame image.

Additionally, the processor may be configured to identify a product held in the hand among the detected at least one product based on the predicted hand region.

Additionally, the storage medium may be configured to include an input queue, a detection queue, and a counting queue, and the processor may be configured to sequentially store the loaded plurality of frame images in the input queue and detect the at least one product from each frame image sequentially stored in the input queue, sequentially store the detected at least one product in the detection queue to track the detected at least one product within the plurality of frame images, and sequentially store the tracking results in the counting queue to count the detected at least one product.

Additionally, the processor may be configured to load the plurality of frame images according to a predetermined batch size.

In accordance with another aspect of the present disclosure, there is provided a method of controlling an automatic checkout system to be performed by an automatic checkout system including a storage medium and a processor, the method comprises: preparing a product detection model trained based on a training images in which parameters of a plurality of sample images are manipulated; sequentially loading a plurality of frame images; inputting the plurality of loaded frame images into the product detection model to detect at least one product from each frame images; tracking at least one product detected in each frame images; and counting at least one product detected based on a tracking result.

Additionally, the parameter of the plurality of sample images may include at least one of a number of products per training image a rotation angle of each sample image, a scale ratio of each sample image, and a gamma adjustment value of each sample image.

Additionally, the training images may be generated by manipulating the parameter of each of the plurality of sample images to which a binary mask is applied.

Additionally, the training images may be generated by placing sample images to which the binary mask is applied on a checkout counter image, and placing a degree of overlap between products of each sample image in a predetermined cluster ratio range.

Additionally, the method may further include preparing a hand detection model trained to detect a hand region from a plurality of input images; and inputting the plurality of frame images into the hand detection model to predict at least one hand region from each frame image.

Additionally, the tracking the detected at least one product may include identifying a product held in the hand among the detected at least one product based on the predicted hand region.

Additionally, the storage medium may include an input queue, a detection queue, and a counting queue, and the detecting the at least one product may include sequentially storing the loaded plurality of frame images in the input queue and detecting the at least one product from each frame image sequentially stored in the input queue, the tracking the detected at least one product may include sequentially storing the detected at least one product in the detection queue to track the detected at least one product within the plurality of frame images, and the counting the detected at least one product may include sequentially storing the tracking results in the counting queue to count the detected at least one product.

Additionally, the sequentially loading the plurality of frame image may include loading the plurality of frame images according to a predetermined batch size.

In accordance with another aspect of the present disclosure, there is provided a non-transitory computer readable storage medium storing computer executable instructions, wherein the instructions, when executed by a processor, cause the processor to perform a method of controlling an automatic checkout system, the method comprise: preparing a product detection model trained based on a training images in which parameters of a plurality of sample images are manipulated; sequentially loading a plurality of frame images; inputting the plurality of loaded frame images into the product detection model to detect at least one product from each frame images; tracking at least one product detected in each frame images; and counting at least one product detected based on a tracking result.

According to one embodiment of the present disclosure, the accuracy of product detection, tracking, and counting can be increased. Specifically, the performance of the automatic checkout system can be improved by automatically generating a training images that reflect the special characteristics of the automatic checkout environment and using the detection model trained on such images.

Additionally, a processing speed of the automatic checkout system can be improved by batching the entire system and adjusting the system to suit the queue size.

DETAILED DESCRIPTION

Figure 1:
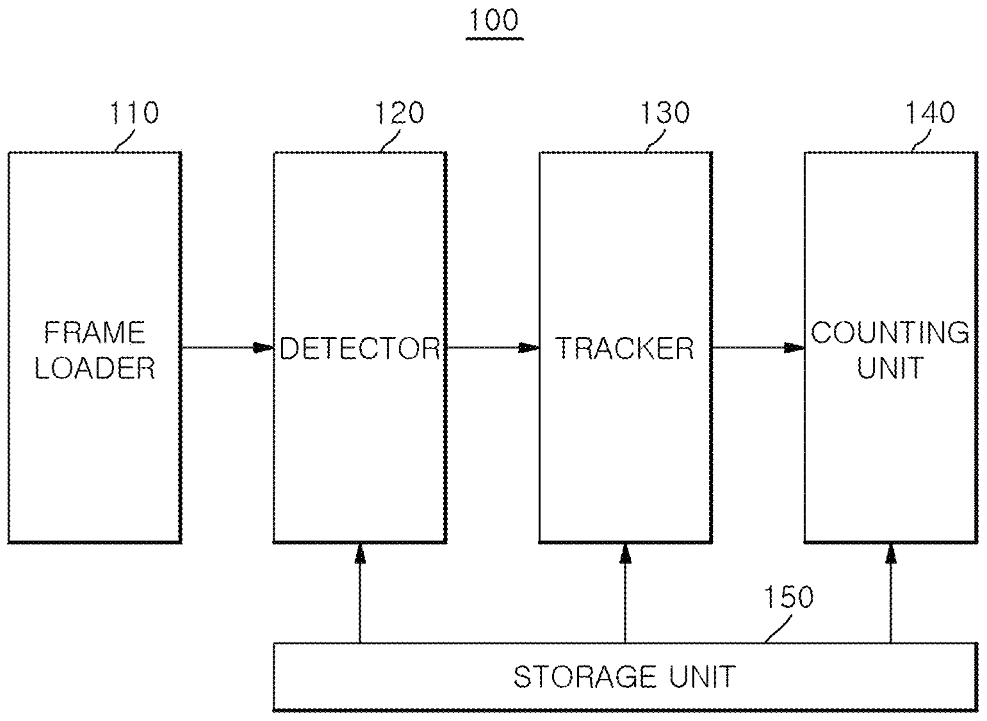
FIG. 1 is a control block diagram of an automatic checkout system according to one embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a control block diagram of an automatic checkout system according to one embodiment of the present disclosure.

An automatic checkout system 100 of the present disclosure refers to a detection system that accurately detects the presence of each product from a combination of products selected by a user and counts the products.

In general, this detection system may be trained from images acquired in the same or similar environment as the actual use environment. In the case of automatic checkout, the training image may be an image of various combinations of products placed on the checkout counter.

However, because the types of products that must be detected at the checkout counter are vast and the inventory status is frequently updated, it may be realistically difficult to train the detection model to learn all possible product combinations.

To solve this problem, the automatic checkout system 100 of the present disclosure can use a detection model created by training upon a training image dataset based on a plurality of sample images.

Specifically, referring to FIG. 1, the automatic checkout system 100 according to one embodiment of the present disclosure may include a frame loader 110, a detector 120, a tracker 130, a counting machine 140, and a storage unit 150.

The frame loader 110 may sequentially load multiple frame images. In this case, the loaded frame image is an image containing at least one product placed on the checkout counter, and the frame image according to one embodiment may be acquired by a camera placed from the top of the checkout counter toward the checkout counter.

The detector 120 may detect at least one product from each of a plurality of frame images using a detection model. Here, the detection model may be created by training upon a training image dataset obtained by manipulating the parameters of a plurality of sample images. This detection model may be pre-stored in the storage unit 150 and provided to the detector 120 as needed, or may be received directly from an external device, server, or cloud.

The tracker 130 may track at least one product detected by the detector 120 within a plurality of frame images, and the counting machine 140 may track at least one product detected by the detector 120 based on the tracking result.

Although not illustrated in FIG. 1, the automatic checkout system 100 may further include a hand predictor that predicts at least one hand area from each of a plurality of frame images using a hand detection model. In this case, the tracker 130 may identify the product held in the hand among at least one product detected based on the predicted hand area and proceed with tracking the product held in the hand.

The automatic checkout system 100 according to the embodiment of FIG. 1 may load and process multiple frame images in real time according to a synchronization method. In contrast, the automatic checkout system 100 according to another embodiment may load a plurality of frame images according to a predetermined batch size according to an asynchronization method, store the plurality of frame images in the queue of each component, and then process the images. Specifically, the frame loader 110 may load a plurality of frame images according to a predetermined batch size, and the detector 120 may sequentially store the loaded plurality of frame images in the input queue and then detect at least one product from each of the plurality of frame images according to the batch size. Moreover, the tracker 130 may sequentially store at least one detected product in a detection queue and track at least one product detected within a plurality of frame images according to the batch size, and the counting machine 140 may sequentially store the tracking results in a counting queue and then count at least one product detected according to the batch size.

At least part of the configuration of the automatic checkout system 100 according to one embodiment of the present disclosure may be implemented by an arithmetic device including a memory including control software programmed to perform such functions and a microprocessor executing such software. In this case, each of the components of the automatic checkout system 100 according to the embodiment of FIG. 1 may be independently implemented by a microprocessor, or at least two components may be implemented by one microprocessor. For example, in the automatic checkout system 100 according to one embodiment of the present disclosure, while at least one of the frame loader 110, the hand predictor, the tracker 130, and the counting machine 140 may be implemented by a CPU, the object detector 120, which requires a lot of computation, may be implemented by a GPU.

The configuration of the automatic checkout system 100 according to one embodiment of the present disclosure has been described. Hereinafter, a method of controlling the automatic checkout system 100 according to one embodiment of the present disclosure will be described.

Figure 2:
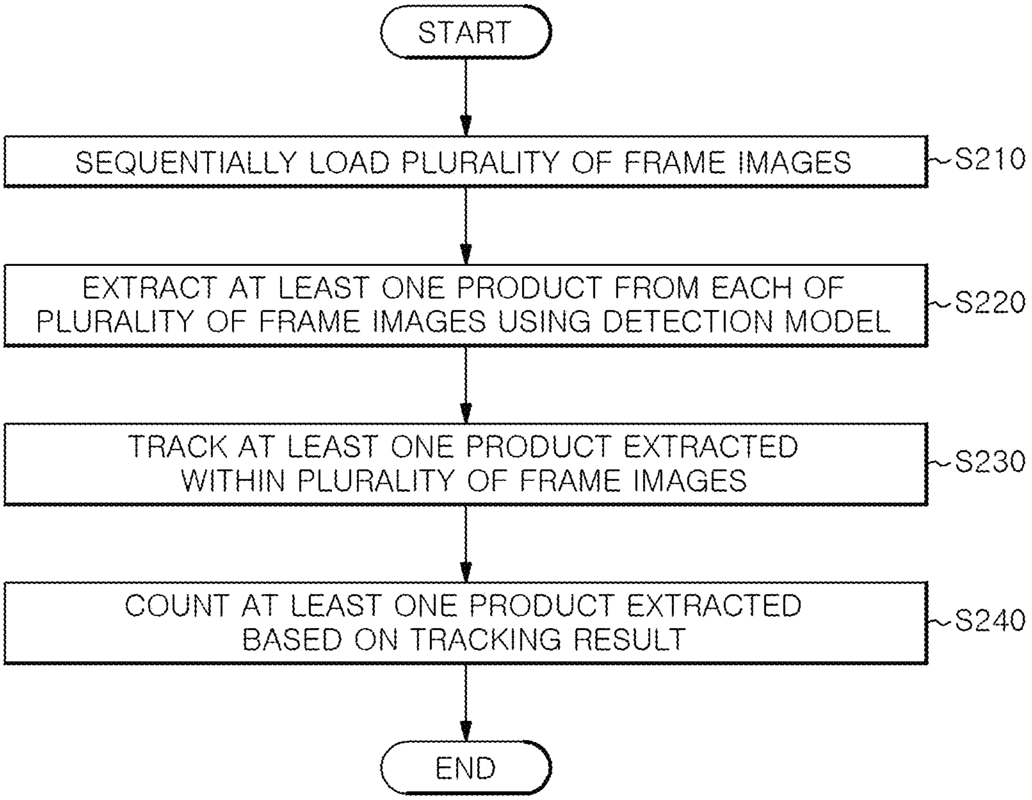
FIG. 2 is a flowchart of a method of controlling the automatic checkout system according to one embodiment of the present disclosure.
Figure 3:
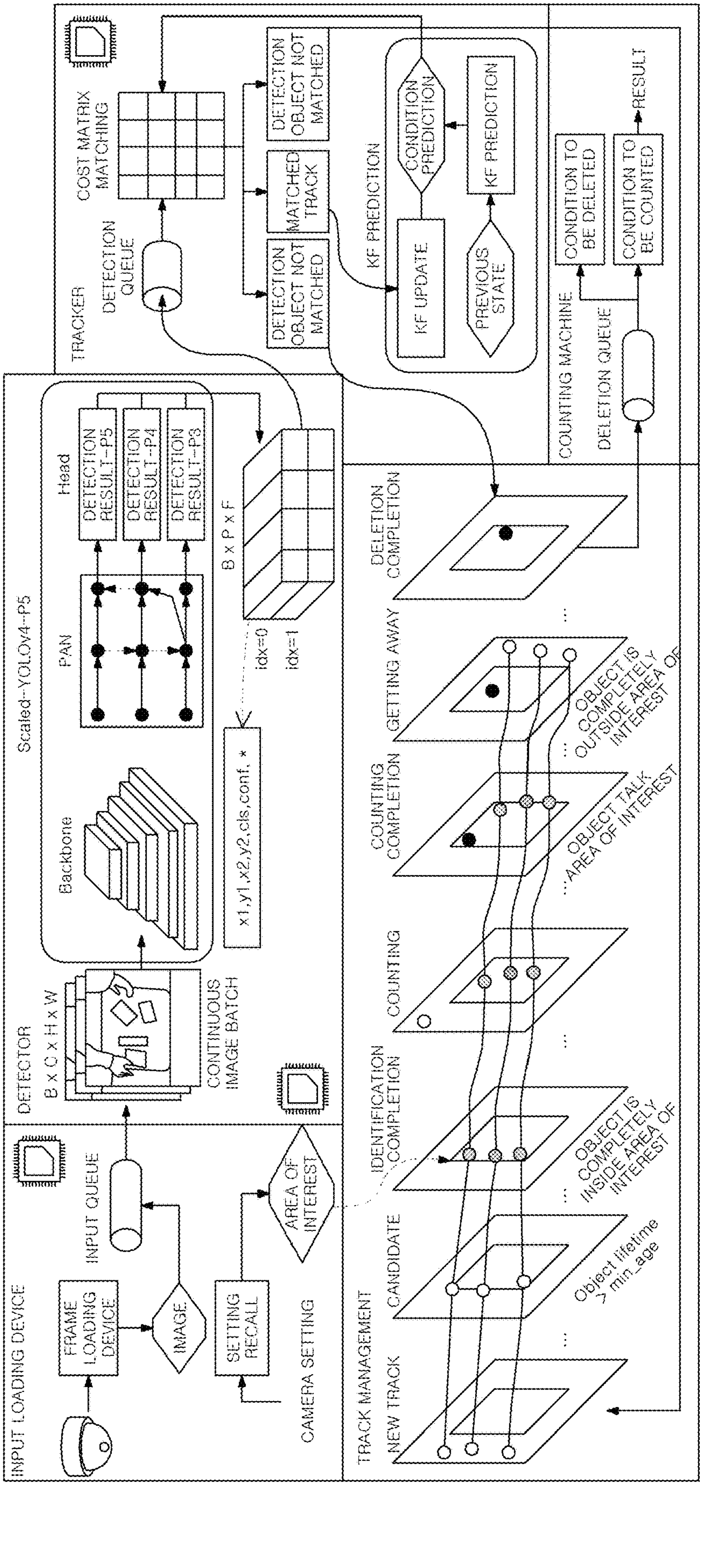
FIG. 3 is a diagram schematically illustrating an operation of the automatic checkout system according to the control method of FIG. 2.

FIG. 2 is a flowchart of the method of controlling an automatic checkout system according to one embodiment of the present disclosure, and FIG. 3 is a diagram schematically illustrating the operation of the automatic checkout system according to the control method of FIG. 2. FIG. 3 assumes that the automatic checkout system operates in an asynchronization method.

Referring to FIG. 2, first, the automatic checkout system 100 according to one embodiment of the present disclosure may sequentially load the plurality of frame images (S210). As illustrated in FIG. 3, the frame loader 110 of the automatic checkout system 100 according to one embodiment of the present disclosure may sequentially load a plurality of frame images for product combinations on the checkout counter obtained by a camera that photographs the checkout counter. In this case, the frame loader 110 can also load camera settings.

As described above, the frame loader 110 may load the plurality of frame images according to a predetermined batch size. When following the asynchronization method, the frame loader 110 may sequentially store the plurality of frame images loaded according to the batch size in the input queue.

Next, the automatic checkout system 100 according to one embodiment of the present disclosure can detect at least one product from each of the plurality of frame images using the detection model (S220). Prior to this, the automatic checkout system 100 according to one embodiment of the present disclosure may directly create and store the detection model, or receive and store the detection model from the outside in advance.

Hereinafter, a detection model generation method used in the control method of FIG. 2 will be described with reference to FIGS. 4 and 5.

Figure 4:
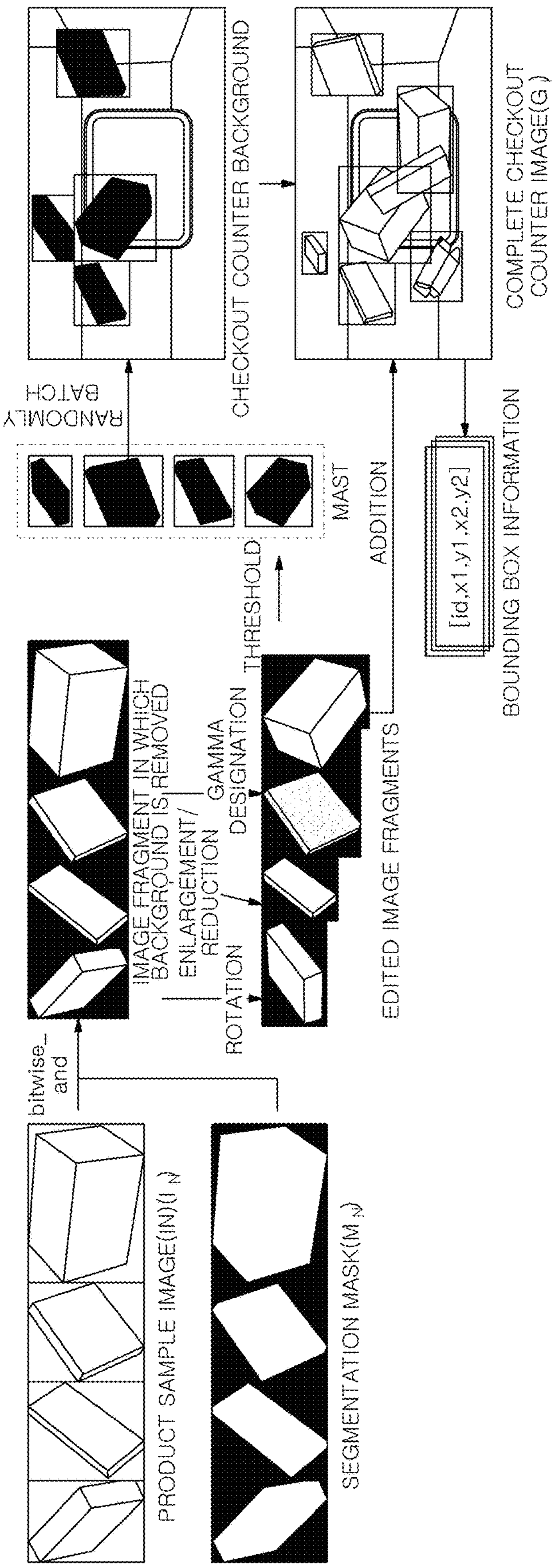
FIG. 4 is a diagram schematically illustrating a training image generation method used for training a detection model according to one embodiment of the present disclosure.
Figure 5:
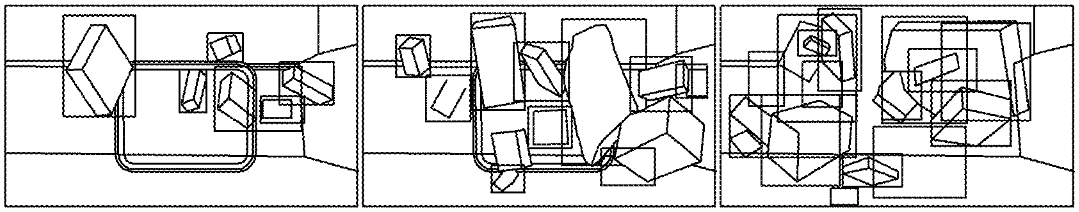
FIG. 5 is a diagram illustrating a training image generated according to the method of FIG. 4.

FIG. 4 is a diagram schematically illustrating the training upon image generation method used for training the detection model according to one embodiment of the present disclosure, and FIG. 5 is a diagram illustrating the training images generated according to the method of FIG. 4.

As mentioned earlier, it may be impossible to train a detection model for all possible product combinations. Therefore, in training a detection model according to one embodiment of the present disclosure, sample images (that is, from advertising/promotional videos, etc.) of each product taken in a controlled environment are collected, and then a training image may be created using the sample image.

Referring to FIG. 4, when a set of products $P=\{p_i\}$ is given, first, a set of individual sample images $S=\{(I_s, M_s, y_s)|y_s \in P\}$ can be collected. Here, $I_s$ refers to a single product image, $M_s$ refers to a binary mask in which pixels corresponding to the product are painted white, and $y_s$ refers to an ID or classification of the product. One embodiment of the present disclosure is a set of single product sample images $S_{aic}$=<116,500 images; 116 ids>, and the Retail Dataset (dataset section related to retail stores) of the 2022 AI City Challenge may be used. At this time, the sample image can be created by the 3D scanning results of each product.

By randomly selecting a product sample image in Saic and then randomly setting the location, occlusion, cluster ratio, and lighting environment on the checkout counter background, a checkout counter image may be created as a training image. The set $G=\{g_i\}$ of checkout counter images generated in this way can be configured as illustrated in Equation 1.

$$g_i = p(N, a, s, g, c) \quad \text{[Equation 1]}$$

Here, $N=\{(I_n, M_n, y_n)\} \in S$ may mean a subset composed of n randomly selected sample images, and (a, s, g, c) may represent the parameter applied to each $I_n$. In this case, the value of the parameter according to one embodiment may be randomly selected within the range specified in Table 1, but is not limited thereto.

TABLE 1

| Parameter | Explanation | Range of possible values |
|---|---|---|
| n | Number of products per image | [7, 12] |
| a | Rotation angle | [0, 360] |
| s | Scale ratio | [0.8, 1.2] |
| g | Gamma adjustment value | [0.8, 1.0] |
| c | Cluster ratio | [0, 1, 0.5] |

In particular, the training image may be created by manipulating the parameters of each of the plurality of sample images to which the binary mask is applied. Specifically, to remove the background of the sample image, an "AND" bit operation may be applied between $I_n$ and $M_n$. Next, manipulation (rotation, scaling, gamma adjustment) of parameters (a, s, g) may be performed for each image fragment. After manipulating the sample image, a mask may be obtained by applying Threshold Invert to each image fragment. The mask obtained in this way may be randomly placed on the actual checkout counter image obtained as the background image so that an intersection over union (IoU) value of the bounding boxes does not exceed the cluster ratio c. Accordingly, the training image may be created by arranging the degree of overlap between the products of each of the plurality of sample images within a predetermined cluster ratio range.

FIG. 5 is a diagram illustrating a training images to which different cluster ratios are applied. The cluster ratio increases from left to right, and the higher the cluster ratio, the higher the detection difficulty.

The detection model may be created by training upon multiple training images generated through the above method. The detection model according to one embodiment of the present disclosure can be created by training the Scaled YOLOv4 model, but is not limited to this.

In order to fine-tune the pre-trained MS COCO model, a dataset according to one embodiment of the present disclosure may be divided and used at a ratio of 80% to 20%, which is a standard ratio of training dataset to validation dataset. Additionally, since parameter manipulation is additionally applied to generation of a computational image, the training image may undergo two editing processes as a result. Accordingly, an overfitting phenomenon may be prevented from occurring in the detection model, and the model can be trained to be applicable to various scales. The detection model is trained by a stochastic gradient descent (SGD), and at this time, the weight determined to be the most optimal for the validation dataset may be selected for inference.

The detection model created in this way may be pre-stored in the storage unit 150 within the automatic checkout system 100 and provided when necessary, or may be received directly from a device, server, or cloud outside the automatic checkout system 100.

Referring again to FIG. 2, the detection unit of the automatic checkout system 100 according to one embodiment of the present disclosure may detect a bounding box as at least one product from each of a plurality of frame images using the detection model generated by the method of FIG. 4.

In this case, the detector 120 may also be provided to respond to the batched input/output format. Additionally, at least one product detected according to the batch size may be sequentially stored in the detection queue.

Meanwhile, in order to recognize the product held in the hand, the automatic checkout system 100 according to one embodiment of the present disclosure may localize the customer's hand within the loaded frame image. Specifically, the hand predictor of the automatic checkout system 100 according to one embodiment of the present disclosure may use a hand detection model generated by extracting an index of 21 points from each of both hands.

Figure 6:
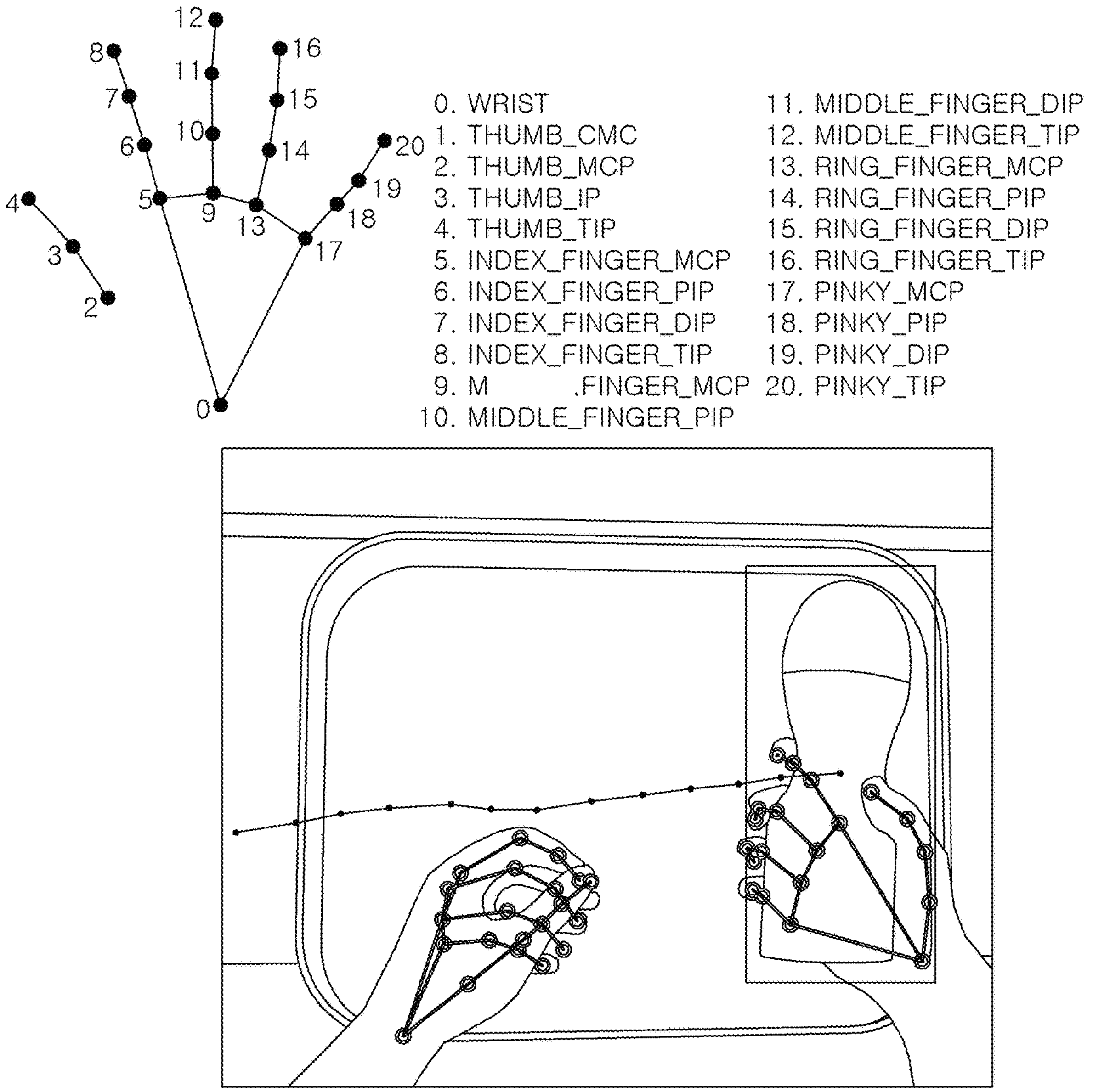
FIG. 6 is a diagram illustrating a hand detection model used by a hand predictor according to one embodiment of the present disclosure.

FIG. 6 is a diagram illustrating a hand detection model used by the hand predictor according to one embodiment of the present disclosure.

Referring to FIG. 6, the hand detection model can be implemented through the MediaPipe framework, which has a structure in which several artificial intelligence models work together. The hand detection model may include a palm detection model that finds and outputs the bounding box of the palm that exists throughout the frame image and a hand indicator extraction model that generates a high-performance 3D structure connected to multiple points from a palm presence area found in the palm detection model.

These hand predictors operate in parallel with the detector 120, and all localization result information obtained from each may be used to track the product. Accordingly, the automatic checkout system 100 according to one embodiment of the present disclosure may distinguish between products held in the hand and products not held in the hand and track the products.

Next, the automatic checkout system 100 according to one embodiment of the present disclosure may track at least one product detected by the detector 120 within the plurality of frame images (S230). To this end, first, the tracker 130 of the automatic checkout system 100 according to one embodiment of the present disclosure may assign a unique ID to the product when the detected product enters the ROI within the frame image. This unique ID may be maintained as long as the product is within a visible area, and may indicate that a newly detected product is currently being tracked. Accordingly, one product may not be identified repeatedly.

When bounding boxes are input according to detection, the detector 120 can use a SORT method for multi-product tracking purposes. When the camera is installed with the lens facing downward on the checkout counter, memory usage efficiency and overall processing speed may be increased by using a simple tracking method such as the SORT.

The SORT method may use a Kalman filter for motion prediction and use the Hungarian algorithm for track allocation. The Kalman filter may be used to change the tracking state to a new target by initializing a tracking state for detection results that have not yet been matched, and the matched tracking result may be used to update the tracking state of the existing target.

At this time, the state space for each target can be defined as a dimensional state variable (u, v, s, r, u', v', s'). Here, u and v may represent horizontal and vertical 2D pixel coordinates of a target center, and s and r may represent an area and an aspect ratio of the bounding box, respectively. A standard Kalman filter in uniform motion and linear observation models may specify and target a track fragment k, and the k may be used for counting in the next step. When assigning a new detection result to an existing target, the shape of the bounding box of each target may be estimated by predicting the unique position in the current frame. Afterwards, an allocation cost matrix is calculated, which may be determined as the IoU between the actually detected bounding box and all bounding box prediction results for the target. The IoU distance, which is used as a cost evaluation standard for optimal matching, may be obtained from SORT, which illustrates fast and efficient performance while being used in parallel with the Kalman filter. In other words, the cost when matching a certain track fragment $T_j$ for a certain detection Di can be calculated through IoU. At this time, the optimal solution may be obtained using the Hungarian algorithm.

In this case, the tracker 130 may also be prepared to respond to the batched input/output format. Additionally, tracking results according to batch size may also be sequentially stored in the counting queue.

Finally, the automatic checkout system 100 according to one embodiment of the present disclosure may count at least one product detected by the detector 120 based on the tracking result (S240). Specifically, the counting machine 140 of the automatic checkout system 100 according to one embodiment of the present disclosure may count the product at the time the product appears in the ROI according to the tracking result, and may not perform duplicate counting while tracking is in progress.

In the case of the asynchronization method, the counting machine 140 of the automatic checkout system 100 according to one embodiment of the present disclosure may count the product by determining that the counting condition is satisfied whether the unique ID of the product is initially identified, and when the unique ID of the counted product is identified in the subsequent counting queue, the counting machine may determine that the conditions for deletion are satisfied and delete the corresponding queue without the product counting.

Figure 7:
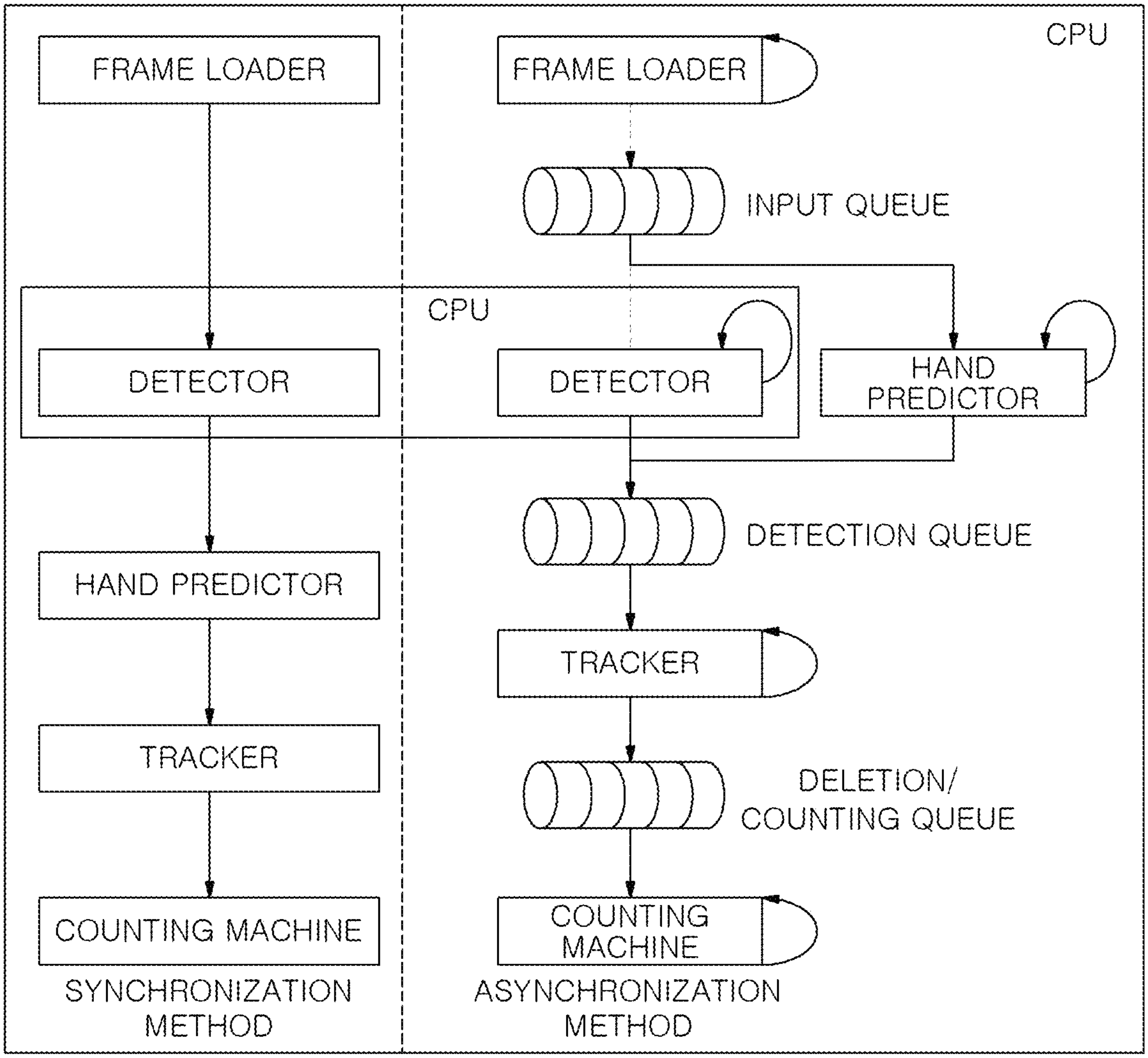
FIG. 7 is a diagram to explain a method of controlling the automatic checkout system according to one embodiment of the present disclosure by dividing the control method into a synchronization method and an asynchronization method.

FIG. 7 is a diagram to explain the method of controlling the automatic checkout system according to one embodiment of the present disclosure by dividing the method into a synchronization method and an asynchronization method.

When the automatic checkout system 100 according to one embodiment of the present disclosure is performed in the synchronization method, the automatic checkout system 100 may detect/track/count the product by loading the frame image periodically acquired by the camera in real time.

Meanwhile, when the automatic checkout system 100 according to one embodiment of the present disclosure is performed in the asynchronization method, the automatic checkout system 100 may include an input queue, a detection queue, and a counting queue to store data in a queue and process the queues depending on the batch size.

Specifically, in order to increase the speed of inference in the asynchronization method, the automatic checkout system 100 according to one embodiment of the present disclosure may batch the entire system and adjust the system to the queue size. For example, the automatic checkout system 100 according to one embodiment of the present disclosure may reduce the input to the detector 120 to a batch size in order to maximize GPU capabilities. Additionally, the automatic checkout system 100 according to one embodiment of the present disclosure may control each component to process work in independent threads and may be provided with input and output queues between components.

When the RGB image batch $I=\{I_i|t\leq i\leq t+B\}$ captured at time [t, t+B] is input (or, $I\in R^{B\times C\times H\times W}$), as the result, the detector 120 may output the batch $D=\{D_i|R^{P\times F}|t\leq i\leq t+B\}$. Here, B may mean the size of the batch, Pi may mean the number of detections in batch i, and F may mean [x1, y1, x2, y2, cls, conf], that is, may refer to a list of visual features meaning x of the upper left point, x coordinate of lower right of y coordinate, the y coordinate, the class ID, and the confidence score.

Since each detection result is integrated with the corresponding time step index (frame index), the results can be output according to time order. As a result, the inference speed of the automatic checkout system 100 can be improved.

In this way, according to one embodiment of the present disclosure, the accuracy of product detection, tracking, and counting can be increased. Specifically, the performance of the automatic checkout system can be improved by automatically generating a training image dataset that reflects the special characteristics of the automatic checkout environment and using the training the detection model on the dataset. Additionally, the processing speed of the automatic checkout system can be improved by batching the entire system and adjusting the system to suit the queue size.

Meanwhile, each step included in the automatic checkout system control method according to the above-described embodiment may be implemented in a computer-readable recording medium that records a computer program programmed to perform these steps.

Additionally, each step included in the automatic checkout system control method according to the above-described embodiment may be implemented as a computer program programmed to perform these steps.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An automatic checkout system comprising:

a storage medium configured to store a product detection model and one or more commands, wherein the storage medium includes an input queue, a detection queue, and a counting queue; and a processor configured to execute the one or more commands stored in the storage medium, wherein the commands, when executed by the processor, cause the processor to:

sequentially load a plurality of frame images according to a predetermined batch size and an asynchronization method and store the plurality of frame images in the input queue, detect at least one product from each of the plurality of frame images sequentially stored in the input queue by inputting the plurality of frame images into the product detection model according to the predetermined batch size, wherein the product detection model is trained based on training images in which a degree of overlap between products is placed within a predetermined cluster ratio range, track the detected at least one product by sequentially storing detection results in the detection queue, and count the detected at least one product by sequentially storing tracking results in the counting queue, wherein at least two of the loading, the detecting, the tracking, and the counting are performed by independent threads via the input queue, the detection queue, and the counting queue.

2. The automatic checkout system of claim 1, wherein parameters of the plurality of sample images used to generate the training images include at least one of a number of products per training image, a rotation angle of each sample image, a scale ratio of each sample image, and a gamma adjustment value of each sample image.

3. The automatic checkout system of claim 1, wherein the training images are generated by applying a bit-wise AND operation between each of a plurality of sample images and a corresponding binary mask to remove a background before manipulating parameters of the sample images.

4. The automatic checkout system of claim 3, wherein the training images are generated by placing the sample images to which the binary mask is applied on a checkout counter image, and arranging the degree of overlap such that an intersection over union (IoU) value of bounding boxes does not exceed the predetermined cluster ratio range.

5. The automatic checkout system of claim 1, wherein a hand detection model is configured to extract an index of 21 points from each of both hands and comprises a palm detection model and a hand indicator extraction model.

6. The automatic checkout system of claim 5, wherein the processor is configured to identify a product held in a hand among the detected at least one product by parallelly executing the hand detection model and the product detection model.

7. The automatic checkout system of claim 1, wherein the processor comprises a GPU (Graphics Processing Unit) and a CPU (Central Processing Unit), and wherein the detecting is performed by the GPU while at least one of the loading, the tracking, and the counting is performed by the CPU to manage data flow via the independent threads.

8. The automatic checkout system of claim 1, wherein each detection result is integrated with a corresponding frame index to be output according to a time order regardless of an asynchronous processing speed of the independent threads.

9. A method of controlling an automatic checkout system including a storage medium and a processor, the method comprising:

preparing a product detection model trained based on training images in which a degree of overlap between products is placed within a predetermined cluster ratio range;

sequentially loading a plurality of frame images according to a predetermined batch size and an asynchronization method and storing the plurality of frame images in an input queue;

inputting the plurality of frame images sequentially stored in the input queue into the product detection model to detect at least one product according to the predetermined batch size and sequentially storing detection results in a detection queue;

tracking the detected at least one product by sequentially storing the detection results in the detection queue; and counting the detected at least one product by sequentially storing tracking results in a counting queue, wherein at least two of the loading, the detecting, the tracking, and the counting are performed by independent threads via the input queue, the detection queue, and the counting queue.

10. The method of claim 9, wherein parameter of the plurality of sample images used to generate the training images include at least one of a number of products per training image a rotation angle of each sample image, an enlargement ratio or reduction ratio of each sample image, and a gamma adjustment value of each sample image.

11. The method of claim 9, wherein the training images are generated by applying a bit-wise AND operation between each of a plurality of sample images and a corresponding binary mask to remove a background before manipulating parameters of the plurality of sample images.

12. The method of claim 11, wherein the training images are generated by placing the sample images to which the binary mask is applied on a checkout counter image, and arranging the degree of overlap such that an intersection over union (IoU) value of bounding boxes does not exceed the predetermined cluster ratio range.

13. The method of claim 9, further comprising:

preparing a hand detection model configured to extract an index of 21 points from each hand and comprising a palm detection model and a hand indicator extraction model; and inputting the plurality of frame images into the hand detection model to predict at least one hand region from each frame image.

14. The method of claim 13, wherein the tracking includes identifying a product held in a hand among the detected at least one product by parallelly executing the hand detection model and the product detection model.

15. The method of claim 9, wherein the detecting is performed by a GPU (Graphics Processing Unit) while at least one of the loading, the tracking, and the counting is performed by a CPU (Central Processing Unit) to manage data flow via the independent threads.

16. The method of claim 9, wherein the loading includes integrating each detection result with a corresponding frame index to output the counting result in a chronological order regardless of an asynchronous processing speed of the independent threads.

17. A non-transitory computer readable storage medium storing computer executable instructions, wherein the instructions, when executed by a processor, cause the processor to perform a method comprising:

preparing a product detection model trained based on training images in which a degree of overlap between products is placed within a predetermined cluster ratio range;

sequentially loading a plurality of frame images according to a predetermined batch size and an asynchronization method and storing the plurality of frame images in an input queue;

detecting at least one product from each frame images by inputting the plurality of frame images into the product detection model according to the predetermined batch size and sequentially storing detection results in a detection queue;

tracking the detected at least one product by sequentially storing the detection results in the detection queue; and counting the detected at least one product by sequentially storing tracking results in a counting queue, wherein at least two of the loading, the detecting, the tracking, and the counting are performed by independent threads via the input queue, the detection queue, and the counting queue.

18. The non-transitory computer-readable storage medium of claim 17, further comprises:

preparing a hand detection model configured to extract an index of 21 points from each hand; and inputting the plurality of frame images into the hand detection model to predict at least one hand region from each frame image.

19. The non-transitory computer-readable storage medium of claim 17, wherein the tracking includes identifying a product held in a hand among the detected at least one product by parallelly executing the hand detection model and the product detection model.

20. The non-transitory computer-readable storage medium of claim 17, wherein the instructions further cause the processor to integrate each detection result with a corresponding frame index to output the counting result in a chronological order.

* * * * *